US008520047B2

(12) United States Patent
Seo

(10) Patent No.: US 8,520,047 B2
(45) Date of Patent: Aug. 27, 2013

(54) PRINT HEAD AND IMAGE FORMING APPARATUS INCLUDING THE SAME

(75) Inventor: Woon-Ho Seo, Suwon-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1002 days.

(21) Appl. No.: 12/109,777

(22) Filed: Apr. 25, 2008

(65) Prior Publication Data

US 2009/0147067 A1 Jun. 11, 2009

(30) Foreign Application Priority Data

Dec. 7, 2007 (KR) ........................ 10-2007-0126892

(51) Int. Cl.

*B41J 15/14* (2006.01)
*B41J 27/00* (2006.01)
*G02F 1/13* (2006.01)

(52) U.S. Cl.

USPC .................. 347/258; 349/2; 349/3; 347/241; 347/244; 347/256

(58) Field of Classification Search

USPC ................. 347/134, 136, 137, 239, 241, 244, 347/256, 258; 349/2, 3
See application file for complete search history.

(56) References Cited

U.S. PATENT DOCUMENTS 4,651,176 A * 3/1987 Yamakawa et al. ........... 347/130
6,760,121 B1 * 7/2004 Kimura et al. ................. 358/1.7
6,825,865 B2 11/2004 Fujimoto et al.
7,170,568 B2 * 1/2007 Sekiguchi et al. ................ 349/2
7,804,513 B2 * 9/2010 Masuda ........................ 347/236
2005/0083396 A1 4/2005 Shiota et al.
2005/0219644 A1 * 10/2005 Ehara et al. ................... 358/474
2007/0052660 A1 * 3/2007 Montbach et al. ............ 345/102
2007/0144384 A1 * 6/2007 Inno et al. ..................... 101/467

FOREIGN PATENT DOCUMENTS

| | | |
|---|---|---|
| JP | 03-057659 | 3/1991 |
| JP | 4-98218 | 3/1992 |
| JP | 2000-275644 | 10/2000 |
| JP | 2003-43441 | 2/2003 |
| JP | 2003-170627 | 6/2003 |
| JP | 2003-185802 | 7/2003 |
| JP | 2004-157219 | 6/2004 |
| JP | 2004-306370 | 11/2004 |
| JP | 2006-120781 | 5/2006 |
| KR | 10-0739750 | 7/2007 |
| WO | 2004/035317 | 4/2004 |

OTHER PUBLICATIONS

English language abstract of JP 03-057659, published Mar. 13, 1991.

(Continued)

*Primary Examiner* — Uyen Chau N Le
*Assistant Examiner* — John M Bedtelyon
(74) *Attorney, Agent, or Firm* — Staas & Halsey LLP

(57) ABSTRACT

Provided are a print head and an image forming apparatus. The print head, which selectively irradiates light to each pixel of an image on a photoconductor, the print head includes an illumination unit, which emits light, a liquid crystal layer, which transmits or intercepts the light incident from the illumination unit on a unit pixel basis according to an applied voltage, and a microlens array formed of liquid crystal polymer, which either focuses or does not focus the light passed through the liquid crystal layer onto the photoconductor.

18 Claims, 5 Drawing Sheets

(56) References Cited

OTHER PUBLICATIONS

English language abstract of KR 10-0739750, published Jul. 13, 2007.

Korean Office Action dated Feb. 22, 2012 from Korean Patent Application 10-2007-0126892.

Japanese Office Action dated Dec. 4, 2012 from Japanese Patent Application No. 2008-274655.

* cited by examiner

PRINT HEAD AND IMAGE FORMING APPARATUS INCLUDING THE SAME

CROSS-REFERENCE TO RELATED PATENT APPLICATION

This application claims the benefit of Korean Patent Application No. 10-2007-0126892, filed on Dec. 7, 2007, in the Korean Intellectual Property Office, the disclosure of which is incorporated herein in its entirety by reference.

BACKGROUND OF THE INVENTION

1. Field of the Invention

The present invention relates to a print head and an image forming apparatus including the same, and more particularly, to a print head having a liquid crystal polymer microlens array, and an image forming apparatus including the print head.

2. Description of the Related Art

In order to form an image, a conventional electrophotographic image forming apparatus scans light on a photoconductor charged with a predetermined potential, forming an electrostatic latent image thereon, develops the electrostatic latent image by supplying a developer (toner) from a developing roller spaced apart from the photoconductor so that the developer selectively adheres on the photoconductor according to the potential level thereof, transfer the developed image on a sheet of paper, and fixes the image on the sheet of paper.

Such electrophotographic image forming apparatus includes a laser scanning unit for scanning a laser beam on the photoconductor. However, the laser scanning unit requires a highly precise optical arrangement, and can be very expensive.

As a way of realizing an image forming apparatus without a laser scanning unit, a print head having a structure as shown in FIG. 1 has been suggested.

Referring to FIG. 1, a conventional print head of this type includes a semiconductor light emitting device (hereinafter, referred to as an LED) array 1, which includes a plurality of LEDs, and a SELFOC lens array 5, which condenses light emitted from each of the LEDs of the LED array 1 so as to form an image corresponding to the light from each LED incident on the photoconductor. A SELFOC lens is a type of gradient index (GRIN) lens that operates by ion exchange, for example, an ion exchange between $SiO_2$ and Ag.

Each of the LEDs that forms the LED array 1 are independently turned on/off by a predetermined current level supplied by a driving chip 3 according to an image signal received from a main controller. Light emitted from an LED is condensed in the SELFOC lens array 5 and projected onto the photoconductor so as to form a latent image 7.

When the conventional print head forms the latent image 7 on the photoconductor by turning on/off the LEDs according to the input image signal, the amount of light emitted by each LED may vary. To compensate for the variation of the light output each time a line is scanned in the main scanning direction, each LED is turned on/off with reference to a preset current level corresponding to the respective LED, thereby making the amount of light emitted by each LED uniform. However, this complicates the configuration of a driving circuitries. Further, if the current consumption changes suddenly according to the input image signal, such as when white lines are scanned immediately after black lines had been scanned, a surge effect may be generated, and thus the driving circuit may become damaged.

Another alternative way of realizing an image forming apparatus without a laser scanning unit is disclosed in U.S. Pat. No. 6,825,865, entitled "PRINT HEAD WITH LIQUID CRYSTAL SHUTTER."

A print head disclosed in U.S. Pat. No. 6,825,865, includes a white light source or red, blue, and green light sources, and a liquid crystal shutter for each light source, and is configured to transmit red, blue, and green lights to the corresponding regions of a photoconductive film according to an input voltage. Light transmitted through the liquid crystal shutter is transmitted through a SELFOC lens array via a reflector and then transmitted through a prism to form an image on a photosensitive film.

Since the print head uses a SELFOC lens array and a prism for securing an optical path and for focusing, the mechanical and optical structures of the print head are complicated. Also, since a SELFOC lens is very expensive, the manufacturing costs of the print head thus also increase.

SUMMARY OF THE INVENTION

The present invention provides a print head with improved light delivery efficiency including a microlens array formed of liquid crystal polymer.

The present invention also provides an image forming apparatus having a print head including a microlens array formed of liquid crystal polymer.

According to an aspect of the present invention, there is provided a print head, which selectively irradiates light to each pixel of a photoconductor, the print head including: an illumination unit, which emits light; a liquid crystal layer, which transmits or intercepts the light received from the illumination unit on a pixel unit basis according to an applied voltage; and a microlens array formed of liquid crystal polymer, which focuses or disperses the light passed through the liquid crystal layer onto the photoconductor.

The microlens array may include a plurality of convex lens cells arranged in the width direction of the photoconductor.

In the microlens array, a first surface adjacent to the liquid crystal layer may form a plane, and a second surface facing the first surface may include the convex lens cells.

A first alignment layer may be included in one side of the microlens array.

A second alignment layer may be included in a side of the liquid crystal layer facing the illumination unit.

An ultraviolet (UV) curable polymer layer may be included in the bottom of the microlens array.

The illumination unit may include: a light source, which irradiates light; and a collimating lens, which collimates the light irradiated from the light source.

The illumination unit may include: a first light source, which irradiates first color light; a second light source, which irradiates second color light; a third light source, which irradiates third color light; a first dichroic filter, which transmits the first color light and reflects the second color light; and a second dichroic filter, which transmits the first color light and reflects the third color light, wherein the first, second, and third color lights form a latent image on the same line of the photoconductor.

The first dichroic filter and the second dichroic filter may be disposed along a path of the first color light so as to be non-parallel to each other.

The illumination unit may include any one selected from a light emitting diode (LED), an organic light emitting diode (OLED), inorganic electroluminescence (EL), organic EL, a fluorescent lamp and a xenon lamp.

According to another aspect of the present invention, there is provided an image forming apparatus, including: a photoconductor, on which a latent image may be formed; a print head, which comprises an illumination unit, which emits light, a liquid crystal layer, which transmits or intercepts the light incident from the illumination unit on a pixel unit basis according to an applied voltage, and a microlens array formed of liquid crystal polymer, which selectively focuses the light passed through the liquid crystal layer onto the photoconductor; a developing unit, which forms a developer image corresponding to the latent image by supplying a developer to the photoconductor; a transferring unit, which transfers the developer image formed on the photoconductor to a printing medium; and a fixing unit, which fixes the transferred developer image to the printing medium.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings.

Figure 1:
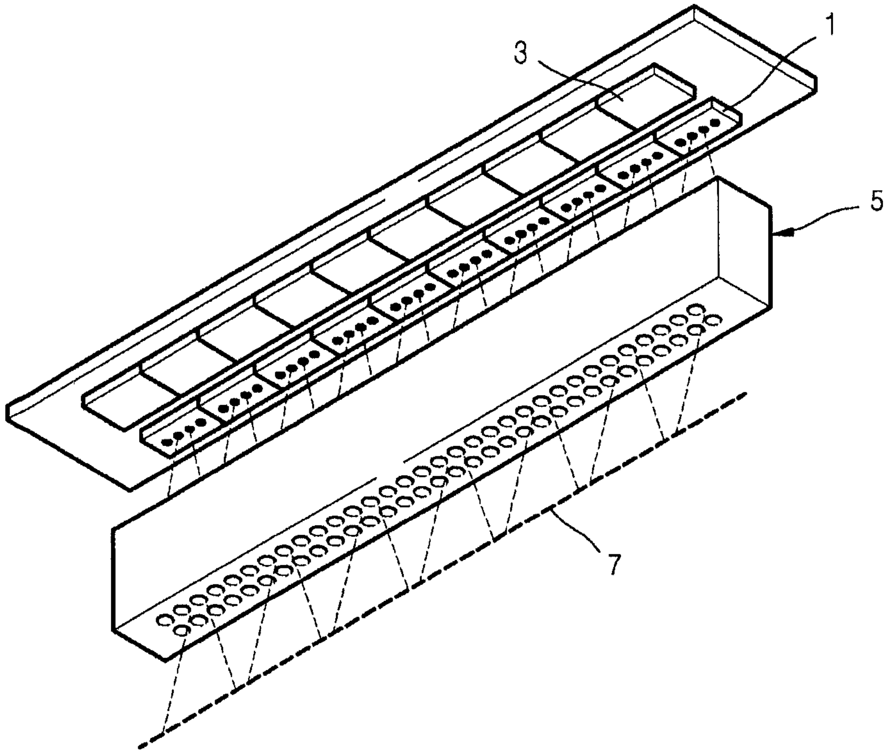
PRIOR ART FIG. 1
FIG. 1 is a diagram illustrating relevant portions of a conventional print head.
Figure 2:
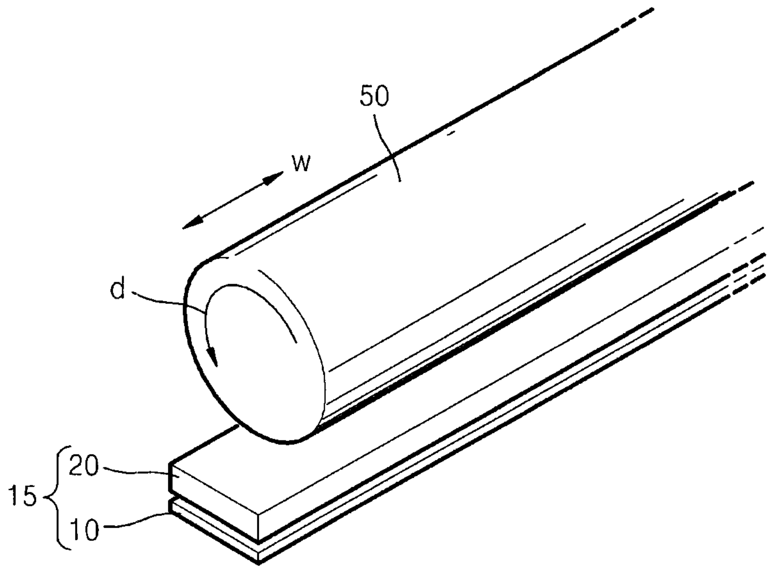
FIG. 2 is a diagram illustrating a structure where a print head is closely disposed to a photoconductor according to an embodiment of the present invention.

FIG. 2 is a diagram illustrating a structure where a print head 15 is disposed in proximity of a photoconductor 50 according to an embodiment of the present invention. The print head 15 includes an illumination unit 10, which emits light, and an optical shutter unit 20, which forms a latent image on the photoconductor 50 by selectively irradiating the light emitted from the illumination unit 10 on the pixels of the photoconductor 50.

The illumination unit 10 may include a monochromatic single chip surface light source or single linear light source. Examples of the single chip surface light source include a light emitting diode (LED), an organic light emitting diode (OLED), inorganic electroluminescence (EL), and organic EL. The single linear light source includes a white light source, e.g., such as a cold cathode fluorescent lamp (CCFL), a xenon lamp, or the like, and a color filter. Also, the illumination unit 10 may include a plurality of light sources that irradiates different color lights. When the illumination unit 10 includes the plurality of light sources of different colors, a color image can be formed by sequentially emitting the color lights.

Figure 3:
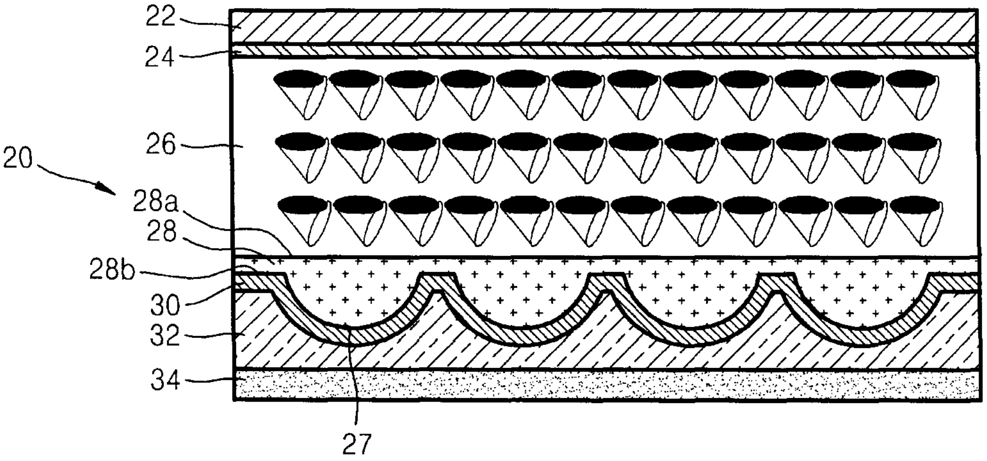
FIG. 3 is a diagram illustrating a print head according to an embodiment of the present invention.

FIG. 3 is a diagram illustrating the print head 15 according to an embodiment of the present invention. Referring to FIG. 3, the optical shutter unit 20 includes a liquid crystal layer 26, which either transmits or intercepts then incident light by on-off controlling the light emitted from the illumination unit 10 on per pixel basis, and a microlens array 28, which condenses the light transmitted through the liquid crystal layer 26 onto the photoconductor 50. A liquid crystal alignment of the liquid crystal layer 26 changes according to an applied voltage, and the liquid crystal layer 26 acts as an optical shutter as the transmissivity or the transmittance of light is controlled according to the liquid crystal alignment. A thin film transistor (TFT) device may be used for driving the voltage of each pixel. The liquid crystal layer 26 may be formed of a ferroelectric liquid crystal or a paraelectric liquid crystal. The operating speed of the optical shutter unit 20 may increase when the ferroelectric liquid crystal is used.

The microlens array 28 may be formed of liquid crystal polymer. The liquid crystal polymer has a birefringence index (anisotropy), and thus can condense or disperse light by using a refractive index difference according to the polarization of light. The microlens array 28 may preferably be formed by using liquid crystal polymer, which can be easily manufactured with low costs.

A first surface 28*a* of the microlens array 28 facing the liquid crystal layer 26 forms a plane, and a second surface 28*b* facing the first surface 28*a* may include a plurality of convex lens cells 27. The plurality of convex lens cells 27 is arranged in a width direction w (or the main scanning direction) shown in FIG. 2 of the photoconductor 50. When the first surface 28*a* is provided as a plane, liquid crystals can be uniformly aligned on the first surface 28*a*, and thus characteristics of the liquid crystals can be improved.

One side of the microlens array 28 may include a first alignment layer 30. The first alignment layer 30 is used to align the liquid crystal layer 26, and may be included in the second surface 28*b* of the microlens array 28. The microlens array 28 is formed by stacking a liquid crystal polymer layer, such as an ultraviolet (UV) curable polymer layer 32 on the first alignment layer 30. Here, an alignment layer may be formed by forming an UV curable polymer layer 32 in a lens shape, forming a film formed of a material such as polyimide on the UV curable polymer layer 32, and then rubbing the combination of the UV curable polymer layer 32 and the film to one direction using a wet rubbing method. Alternatively, an alignment layer may be formed by forming a UV curable polymer layer 32 in a lens shape, forming a photosensitive polymer layer on the UV curable polymer layer 32, and forming a photo pattern by exposing the combination of the UV curable polymer layer 32 and the photosensitive polymer layer to UV. Alternatively, an alignment layer may be formed by forming a pattern having different chemical combinations to one direction on a UV curable polymer layer 32 through a nano imprinting lithography.

The microlens array 28 is formed by stacking a liquid crystal polymer on the first alignment layer 30, which allows the microlens array 28 may be formed in alignment with the liquid crystal layer, and with the proper alignment, the performance of condensing and dispersing light based on anisotropy of the liquid crystal polymer can be improved.

Also, since the first surface 28*a* of the microlens array 28 is a plane, the liquid crystals can be uniformly aligned while forming the liquid crystal layer 26 on the microlens array 28.

A second alignment layer 24 may be further included on the liquid crystal layer 26. In other words, the liquid crystal layer 26 may include the second alignment layer 24 on a surface facing the illumination unit 10. By using the first and/or second alignment layers 30 and 24, the liquid crystal arrangement can be uniform, and the liquid crystal arrangement deviation between the pixels may decrease. The optical shutter unit 20 according to the current embodiment of the present invention is manufactured by sequentially stacking a first transparent electrode 34, the UV curable polymer layer 32 having a lens shape, the first alignment layer 30, the microlens array 28, the second alignment layer 24, and a second transparent electrode 22, and then dropping the liquid crystals between the microlens array 28 and the second alignment layer 24, filling in the space between the microlens array 28 and the second alignment layer 24. The liquid crystals can be uniformly arranged between the first and second alignment layers 30 and 24.

Figure 4:
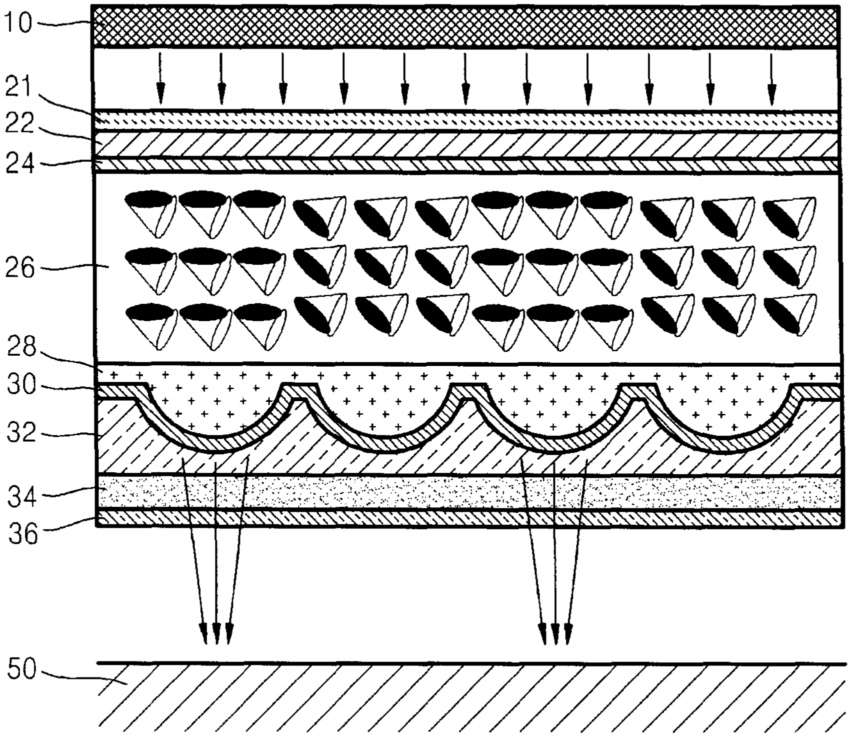
FIG. 4 is a diagram for describing operations of a print head according to an embodiment of the present invention.

Operations of the print head 15 will now be described with reference to FIG. 4. FIG. 4 is a diagram for describing the operations of the print head 15 according to an embodiment of the present invention.

Referring to FIG. 4, a first polarizer 36 is included on the bottom of the first transparent electrode 34 and a second polarizer 21 is included on the top of the second transparent electrode 22. The first and second polarizers 36 and 21 have an orthogonal polarization direction. The first and second transparent electrodes 34 and 22 independently apply a voltage to each pixel. A first polarized light of the light emitted from the illumination unit 10 reaches the liquid crystal layer 26 through the first polarizer 36. The amount of light passing through the liquid crystal layer 26 is controlled by a voltage applied by the first and second transparent electrodes 34 and 22, and thus gray scale of an image can be expressed. Also, polarization of the light after passing through the liquid crystals changes according to the liquid crystal alignment. The light passed through the liquid crystal layer 26 converges or scatter at the microlens array 28. The microlens array 28 has a birefringence characteristic, where refractive indexes are different according to polarization of an incident light. For example, the microlens array 28 has an ordinary refractive index for the first polarized light and an extraordinary refractive index for a second polarized light. The microlens array 28 acts as a lens by focusing or dispersing light having different polarization according to the refractive index of the UV curable polymer layer 32. For example, the first polarized light with the ordinary refractive index may disperse at the microlens array 28, and thus does not form an image on the photoconductor 50, but the second polarized light with the extraordinary refractive index passes through the microlens array 28 and is focused to form an image on the photoconductor 50. Accordingly, only the second polarized light passes through the second polarizer 21 and forms a latent image on the photoconductor 50. The latent images may be simultaneously formed on a line in the width direction or the main scanning direction w (shown in FIG. 2) of the photoconductor 50. Then, successive lines of latent image can be formed by the rotation of the photoconductor 50 in the direction d (shown in FIG. 2), so as to form the entire latent image.

Figure 5:
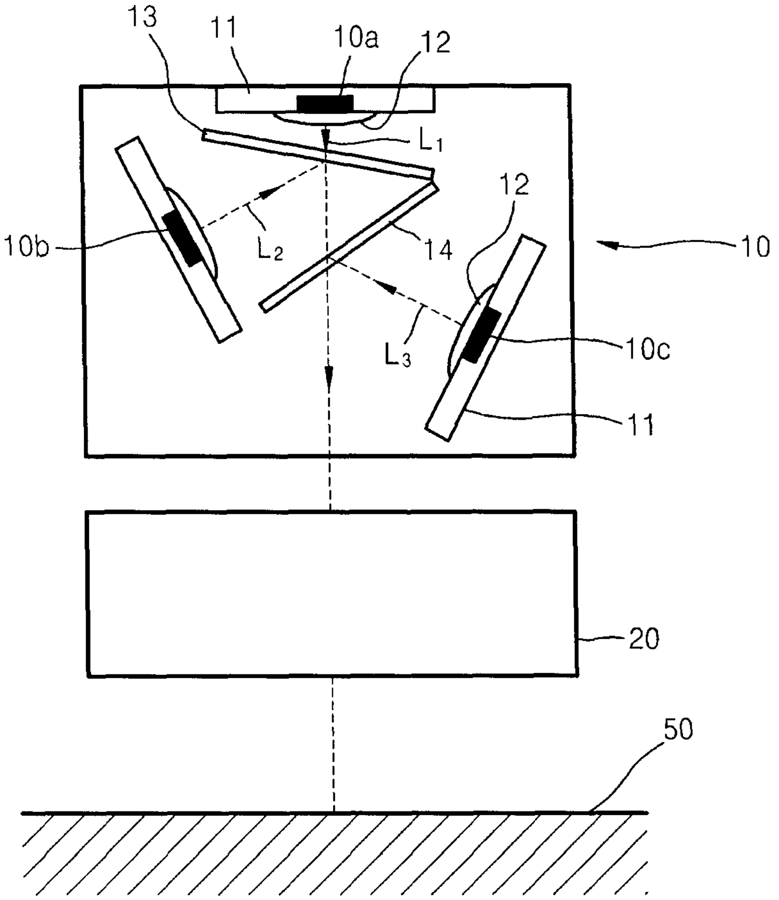
FIG. 5 is a diagram illustrating a print head according to another embodiment of the present invention.

It is also possible to form a color image by using a plurality of color light sources. FIG. 5 illustrates an example of the illumination unit 10 including a plurality of light sources.

The illumination unit 10 includes a first light source 10*a*, which irradiates a first color light L1, a second light source 10*b*, which irradiates a second color light L2, and a third light source 10*c*, which irradiates a third color light L3. The first through third light sources 10*a* through 10*c* are each included in corresponding boards 11, and collimating lenses 12, which collimate light irradiated from each of the respective light sources 10*a* through 10*c*, are disposed adjacent to the corresponding light sources 10*a* through 10*c*. The first through third light sources 10*a* through 10*c* may be in a bar shape formed along a width direction of the photoconductor 50. For example, the first through third light sources 10*a* through 10*c* may respectively be a red surface light source, a green surface light source, and a blue surface light source each formed as a single chip. Also, a first dichroic filter 13, which transmits the first color light L1 and reflects the second color light L2, and a second dichroic filter 14, which transmits the first color light L1 and reflects the third color light L3, may be included so that the first, second, and third color lights L1 through L3 form a latent image on one same line of the photoconductor 50. The first and second dichroic filters 13 and 14 may be disposed on various locations according to an arrangement of the first through third light sources 10*a* through 10*c*. By suitably adjusting the locations of the first and second dichroic filters 13 and 14, the first through third color lights L1 through L3 can be emitted to one optical path through the first and second dichroic filters 13 and 14. In order to emit lights from different directions to one optical path, the first and second dichroic filters 13 and 14 may be positioned unparallel to each other on the path of the first color light L1.

In FIG. 5, two dichroic filters are included for three light sources, but three dichroic filters may be included for three light sources. When three dichroic filters are used, the three light sources are simultaneously emitted so as to simultaneously form three color lines. In this case, a liquid crystal layer and a microlens array should be included for each light source. The structure of an illumination unit could be made simple and the size of the same can be smaller when two dichroic filters are used instead of three dichroic filters. When color lights emitted from a plurality of light sources proceed to the same optical path by using two dichroic filters, each light source sequentially operates. In this case, one optical shutter unit 20 having a liquid crystal layer and a microlens array can be commonly used for all light sources.

Figure 6:
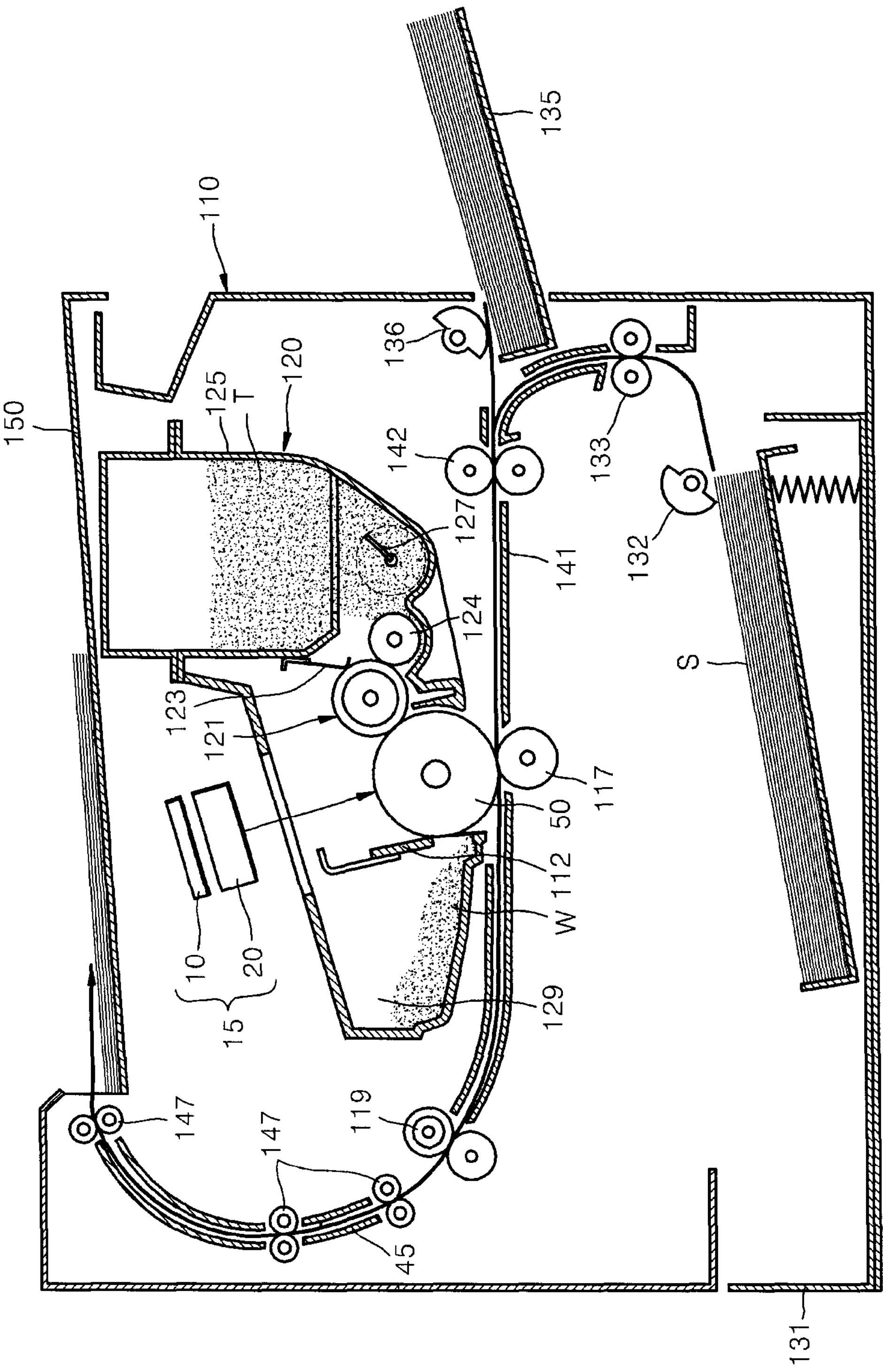
FIG. 6 a diagram illustrating an image forming apparatus employing a print head according to an embodiment of the present invention.

FIG. 6 a diagram illustrating an image forming apparatus employing a print head 15 according to an embodiment of the present invention.

Referring to FIG. 6, the image forming apparatus according to the embodiment includes a photoconductor 50, the print head 15, which forms a latent image on the photoconductor 50, a developing unit 120, which forms an image corresponding to the latent image by supplying a developer T to the photoconductor 50, a transferring unit 117, which transfers the image formed on the photoconductor 50 to a printing medium, and a fixing unit 119, which fixes the transferred image on the printing medium.

The print head 15 forms a latent image on the photoconductor 50 corresponding to each pixel of an image that is to be printed. Here, the structure of the print head 15 is substantially identical to that of the print head 15 described with reference to FIGS. 2 through 5, and thus detailed descriptions thereof will be omitted herein. The photoconductor 50, the print head 15, the developing unit 120, the transferring unit 117, and the fixing unit 119 are included in a cabinet 110.

The developing unit 120 contains the developer T inside a container 125. The developer T is supplied to the photoconductor through an agitator 127, a feed roller 124, and a developing roller 121 so that a toner image can be formed on the latent image of the photoconductor 50. A doctor blade 123 is provided on the circumference of the developing roller 121 so as to regulate the amount of developer T supplied to the developing roller 121. In the developing unit 120 configured as described above, the developer T forms a developer layer in a uniform thickness by passing between the doctor blade 123 and the developing roller 121. A waste developer container 129, which stores a waste toner W collected by a cleaning blade 112 after developing, is provided inside the developing unit 120

The toner image formed on the photoconductor 50 by the developing unit 120 is transferred to a printing medium S fed between the photoconductor 50 and the transferring unit 117, and the transferred image is fused to the printing medium S by the fixing unit 119.

Also, the image forming apparatus, which prints an image on the printing medium S fed from a first and second cassettes 131 and 135, includes a printing media feeding passage 141 and a printing media output passage 45. Along the printing media feeding passage 141, the image forming apparatus includes pick-up rollers 132 and 136, which pick up printing media (S) one by one, a feeding roller 133, which guides the feeding of the picked up printing media (S), and a registration roller 142, which is used to orient the printing medium (S) for proper placement of the image. Along the printing media output passage 145, the image forming apparatus includes the fixing unit 119 and a plurality of ejecting rollers 147. Accordingly on the printing medium S provided from the first and second cassettes 131 and 135 through the printing media feeding passage 141, the image formed in the photoconductor 50 is transferred by the transferring unit 117 and fused by the fixing unit 119. After the image is completely formed on the printing medium S, the printing medium S is stacked in an output tray 150 prepared on the top of the cabinet 110, completing the printing process.

The print head according to the present invention includes a liquid crystal layer and a microlens array formed of liquid crystal polymer. The liquid crystal layer acts as an optical shutter, where gray scale and polarization are controlled by the amount of transmitted light according to a voltage, and the microlens array acts as a lens. With the above structure, the liquid crystal arrangement in the liquid crystal layer does not affect the liquid crystal polymer arrangement in the microlens array. Consequently, the microlens array can stably perform functions of a lens.

Also in the present invention, alignment layers are provided on each side of the liquid crystal layer, and thus the liquid crystal arrangement can be uniform, and deviation of the liquid crystal arrangements of the pixels can be decreased.

Moreover, the image forming apparatus of the present invention employs a print head having a microlens array formed of a liquid crystal polymer, which can take the place of an expensive SELFOC lens. Accordingly, manufacturing costs of the image forming apparatus can be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A print head for forming a latent image on a photoconductor, comprising:
- an illumination unit including at least one light source configured to emit a light;
- a liquid crystal layer configured to selectively transmit the light received from the illumination unit to selected ones of pixels corresponding to the latent image according to an applied voltage;
- a microlens array formed of liquid crystal polymer, which has a birefringence index to condense or disperse light by using a refractive index difference according to a polarization of the light, the microlens array being configured to selectively focus the light passed through the liquid crystal layer onto the photoconductor;
- a first alignment layer formed in a lens shape on a first side of the microlens array, wherein the microlens array is formed between the first alignment layer and a side of the liquid crystal layer farthest from the illumination unit; and
- a second alignment layer formed adjacent a side of the liquid crystal layer closest to the illumination unit such that the liquid crystal arrangement is uniform and the liquid crystal arrangement deviation between the pixels decrease.

2. The print head of claim 1, wherein the microlens array comprises a plurality of convex lens cells arranged to extend along a width direction of the photoconductor.

3. The print head of claim 1, further comprising:
- a first surface adjacent to the liquid crystal layer, the first surface forming a plane; and
- a second surface facing the first surface, the second surface forming a plurality of convex lens cells.

4. The print head of claim 1, further comprising: an ultraviolet (UV) curable polymer layer formed in a lens shape, adjacent the microlens array.

5. The print head of claim 1, wherein the illumination unit further comprises:
- a collimating lens, which collimates the light irradiated from the at least one light source.

6. The print head of claim 1, wherein the at least one light source comprises:
- a first light source, which irradiates first color light;
- a second light source, which irradiates second color light; and
- a third light source, which irradiates third color light, and
- wherein the illumination unit further comprises:
- a first dichroic filter and a second dichroic filter,
- wherein the first dichroic filter and second dichroic filter are positioned unparallel to one another such that the first color light passes through the first and second dichroic filters, the second color light is reflected by the first dichroic filter and passed through the second dichroic filter, and the third color light is reflected by the second dichroic filter,
- and the first, second, and third color lights are emitted on a common optical path to form the latent image on the photoconductor.

7. The print head of claim 6, wherein the first dichroic filter and the second dichroic filter are disposed so as to form an angle with respect to each other along a path of the first color light.

8. The print head of claim 1, wherein the illumination unit comprises any one selected from a light emitting diode (LED), an organic light emitting diode (OLED), inorganic electroluminescence (EL), organic EL, a fluorescent lamp and a xenon lamp.

9. The print head of claim 1, wherein the liquid crystal layer is formed of one of a ferroelectric liquid crystal and a paraelectric liquid crystal.

10. An image forming apparatus, comprising:
- a photoconductor having a photoconductive surface on which a latent image is formed;
- a print head including an illumination unit having at least one light source configured to emit a light, a liquid crystal layer configured to selectively transmit the light received from the illumination unit to selected ones of pixels corresponding to the latent image according to an applied voltage, a microlens array formed of liquid crystal polymer, which has a birefringence index to condense or disperse light by using a refractive index difference according to a polarization of the light, the microlens array being configured to selectively focus the light passed through the liquid crystal layer onto the photoconductor, a first alignment layer formed in a lens shape on a first side of the microlens array wherein the microlens array is formed between the first alignment layer and a side of the liquid crystal layer farthest from the illumination unit, and a second alignment layer formed adjacent a side of the liquid crystal layer closest to the illumination unit such that the liquid crystal arrangement is uniform and the liquid crystal arrangement deviation between the pixels decrease;

a developing unit configured to supply a developer to the latent image on the photoconductor to form a developer image;

a transferring unit configured to transfer the developer image formed on the photoconductor to a printing medium; and a fixing unit configured to fixes the transferred developer image to the printing medium.

11. The image forming apparatus of claim 10, wherein the microlens array comprises a plurality of convex lens cells arranged to extend along a width direction of the photoconductor.

12. The image forming apparatus of claim 10, further comprising:

a first surface adjacent to the liquid crystal layer, the first surface forming a plane; and a second surface facing the first surface, the second surface forming a plurality of convex lens cells.

13. The image forming apparatus of claim 10, further comprising: an ultraviolet (UV) curable polymer layer formed in a lens shape, adjacent the microlens array.

14. The image forming apparatus of claim 10, wherein the illumination unit further comprises:

a collimating lens, which collimates the light irradiated from the at least one light source.

15. The image forming apparatus of claim 10, wherein the at least one light source comprises:

a first light source, which irradiates first color light;

a second light source, which irradiates second color light; and a third light source, which irradiates third color light, and wherein the illumination unit further comprises:

a first dichroic filter and a second dichroic filter, wherein the first dichroic filter and second dichroic filter are positioned unparallel to one another such that the first color light passes through the first and second dichroic filters, the second color light is reflected by the first dichroic filter and passed through the second dichroic filter, and the third color light is reflected by the second dichroic filter, and the first, second, and third color lights are emitted on a common optical path to form the latent image on the photoconductor.

16. The image forming apparatus of claim 15, wherein the first dichroic filter and the second dichroic filter are disposed so as to form an angle with respect to each other along a path of the first color light.

17. The image forming apparatus of claim 10, wherein the illumination unit comprises any one selected from a light emitting diode (LED), an organic light emitting diode (OLED), inorganic electroluminescence (EL), organic EL, a fluorescent lamp and a xenon lamp.

18. The image forming apparatus of claim 10, wherein the liquid crystal layer is formed of one of a ferroelectric liquid crystal and a paraelectric liquid crystal.

* * * * *